US011762932B2

United States Patent
Prateek et al.

(10) Patent No.: US 11,762,932 B2
(45) Date of Patent: Sep. 19, 2023

(54) SPATIAL SEARCH USING KEY-VALUE STORE

(71) Applicant: Amazon Technologies, Inc., Seattle, WA (US)

(72) Inventors: Swagata Prateek, Vancouver (CA); Vi Thuy Hai Nguyen, Vancouver (CA); Timur Amirov, Vancouver (CA); Anton Polyakov, North Vancouver (CA); Szymon Ulewicz, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 419 days.

(21) Appl. No.: 16/917,736

(22) Filed: Jun. 30, 2020

(65) Prior Publication Data

US 2021/0406328 A1 Dec. 30, 2021

(51) Int. Cl.
*G06F 16/00* (2019.01)
*G06F 16/9537* (2019.01)
*G06F 16/901* (2019.01)
*G06F 16/9538* (2019.01)
*H04W 4/021* (2018.01)

(52) U.S. Cl.
CPC ........ *G06F 16/9537* (2019.01); *G06F 16/901* (2019.01); *G06F 16/9538* (2019.01); *H04W 4/021* (2013.01)

(58) Field of Classification Search
None
See application file for complete search history.

(56) References Cited

U.S. PATENT DOCUMENTS

| | | | | |
|---|---|---|---|---|
| 9,501,507 B1* | 11/2016 | Harris | ................. | G06F 16/2255 |
| 9,788,161 B1* | 10/2017 | Xu | ........................ | H04W 4/025 |
| 10,013,449 B1* | 7/2018 | Xiao | .................. | G06F 16/2365 |
| 10,783,173 B2* | 9/2020 | Peterson | ........... | G06F 16/24568 |
| 2003/0212650 A1* | 11/2003 | Adler | .................. | G06F 16/5854 |
| 2006/0036628 A1* | 2/2006 | Adler | .................. | G06F 16/5854 |

(Continued)

FOREIGN PATENT DOCUMENTS

CN 107423368 A 12/2017

OTHER PUBLICATIONS

International Search Report and Written Opinion dated Oct. 13, 2021 in PCT/US2021/039572, Amazon Technologies, Inc., pp. 1-12.

(Continued)

*Primary Examiner* — Jean M Corrielus
(74) *Attorney, Agent, or Firm* — S. Scott Foster; Kowert, Hood, Munyon, Rankin & Goetzel, P.C.

(57) ABSTRACT

A spatial search may be performed using representations of geometric shapes stored in a key-value store. A request to perform a spatial search may be received, the request including a geometric shape composed of one or more points. The points of the geometrical shape may be translated into one or more spatial indexes representing spatial cells using a space-filling curve. A key-value store may then be incrementally searched for each spatial index to identify spatial cells intersecting the geometric shape for which other known geometric shapes exist. The key-value store may then be searched to identify the known geometric shapes intersecting the geometric shape included in the search.

20 Claims, 9 Drawing Sheets

Hilbert curve level 2

Hilbert curve level 3

(56) References Cited

U.S. PATENT DOCUMENTS

| | | | | |
|---|---|---|---|---|
| 2006/0041551 | A1* | 2/2006 | Adler | G06F 16/5854 |
| | | | | 707/999.005 |
| 2008/0133559 | A1* | 6/2008 | Adler | G06F 16/283 |
| 2015/0264523 | A1* | 9/2015 | Xu | H04W 4/025 |
| | | | | 455/456.3 |
| 2017/0293635 | A1* | 10/2017 | Peterson | G06F 16/2477 |
| 2018/0133559 | A1* | 5/2018 | Sullivan | A63B 37/0092 |

OTHER PUBLICATIONS

Zhang, et al., "DM-66 Spatial Indexing", Retrieved from https://gistbok.ucgis.org/bok-topics/spatial-indexing on Jul. 1, 2020, pp. 1-7.

Amazon Web Services, "Amazon DynamoDB Developer Guide", API Version Aug. 10, 2012, Updated Nov. 8, 2019, pp. 1-1136.

John Paul Titlow, "How Foursqure is Building a "Human" Map Framework to Rival Google's", Retrieved from https://www.fastcompany.com/3007394/how-foursquare-building-humane-map-framework-rival-googles?cid=search on Jul. 1, 2020, pp. 1-5.

MongoDB, "New Geo Features in MongoDB 2.4", Retrieved from https://www.mongodb.com/blog/post/new-geo-features-in-mongodb-24 on Jul. 1, 2020, Updated Oct. 10, 2019, pp. 1-10.

Unknown, "S2 Cells", Retrieved from https://s2geometry.io/devguide/s2cell_hierarchy on Jul. 1, 2020, pp. 1-27.

* cited by examiner

| Type 600 | Sort key 610 | Partition key 620 |
|---|---|---|
| CPR | ClientID:2/2210030320 | 2/2210030320300012 |
| CPR | ClientID:2/2210030320 | 2/22100303203000202 |
| CPR | ClientID:2/2210030321 | 2/221003032030002030 |
| CPR | ClientID:2/2210030320 | 2/2210030320300021 |
| CPR | ClientID:2/2210030320 | 2/2210030320300022 |
| CPR | ClientID:2/2210030320 | 2/2210030320300023111 |
| CPR | ClientID:2/2210030320 | 2/2210030320300311122 |
| CPR | ClientID:2/2210030320 | 2/22100303203003112 |
| CPR | ClientID:2/2210030320 | 2/2210030320300312 |
| CPR | ClientID:2/2210030320 | 2/2210030320300321 |
| CMR | ClientID:GeometryID | ClientID:2/2210030320300012 |
| CMR | ClientID:GeometryID | ClientID:2/22100303203000202 |
| CMR | ClientID:GeometryID | ClientID:2/221003032030002030 |
| CMR | ClientID:GeometryID | ClientID:2/2210030320300021 |
| CMR | ClientID:GeometryID | ClientID:2/2210030320300022 |
| CMR | ClientID:GeometryID | ClientID:2/2210030320300023111 |
| CMR | ClientID:GeometryID | ClientID:2/2210030320300311122 |
| CMR | ClientID:GeometryID | ClientID:2/22100303203003112 |
| CMR | ClientID:GeometryID | ClientID:2/2210030320300312 |
| CMR | ClientID:GeometryID | ClientID:2/2210030320300321 |

*FIG. 6*

| Query | Start 700 | End 710 |
|---|---|---|
| 1 | 2/221003032030002121102313321322 | 2/221003032030002121102313321322 |
| 2 | 2/22100303203000212110231332 | 2/22100303203000212110231332 |
| 3 | 2/2210030320300021211023 | 2/22100303203000212110231332 |
| 4 | 2/22100303203000212110231332 *(best read)* | 2/221003032030002121102313 |
| 5 | 2/22100303203000212110 | 2/2210030320300021211023 |
| 6 | 2/221003032030002121 | 2/22100303203000212110 |
| 7 | 2/2210030320300021 | 2/221003032030002121 |
| 8 | 2/22100303203000 | 2/2210030320300021 |
| 9 | 2/221003032030 | 2/22100303203000 |
| 10 | 2/2210030320 | 2/221003032030 |

*FIG. 7*

SPATIAL SEARCH USING KEY-VALUE STORE

BACKGROUND

Spatial searching is of increasing importance as location-based capabilities associated with mobile computing devices, such as geofencing, have become increasingly popular. Customers may define virtual geographic boundaries using specified geometric shapes to provide location-based services based on these geometries including, but not limited to, geofencing and proximity search. While brute-force approaches to geometry search may be satisfactory for a small number of defined geometric shapes, large scale geometry storage and partitioning of the search space is increasingly required.

BRIEF DESCRIPTION OF THE DRAWINGS

FIG. 6 illustrates example data in a key-value store representing a known geometric shape, according to some embodiments.

FIG. 7 illustrates a series of spatial search ranges used to perform a search on a key-value store to identify spatial cells intersecting a geometric shape, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Figure 1:
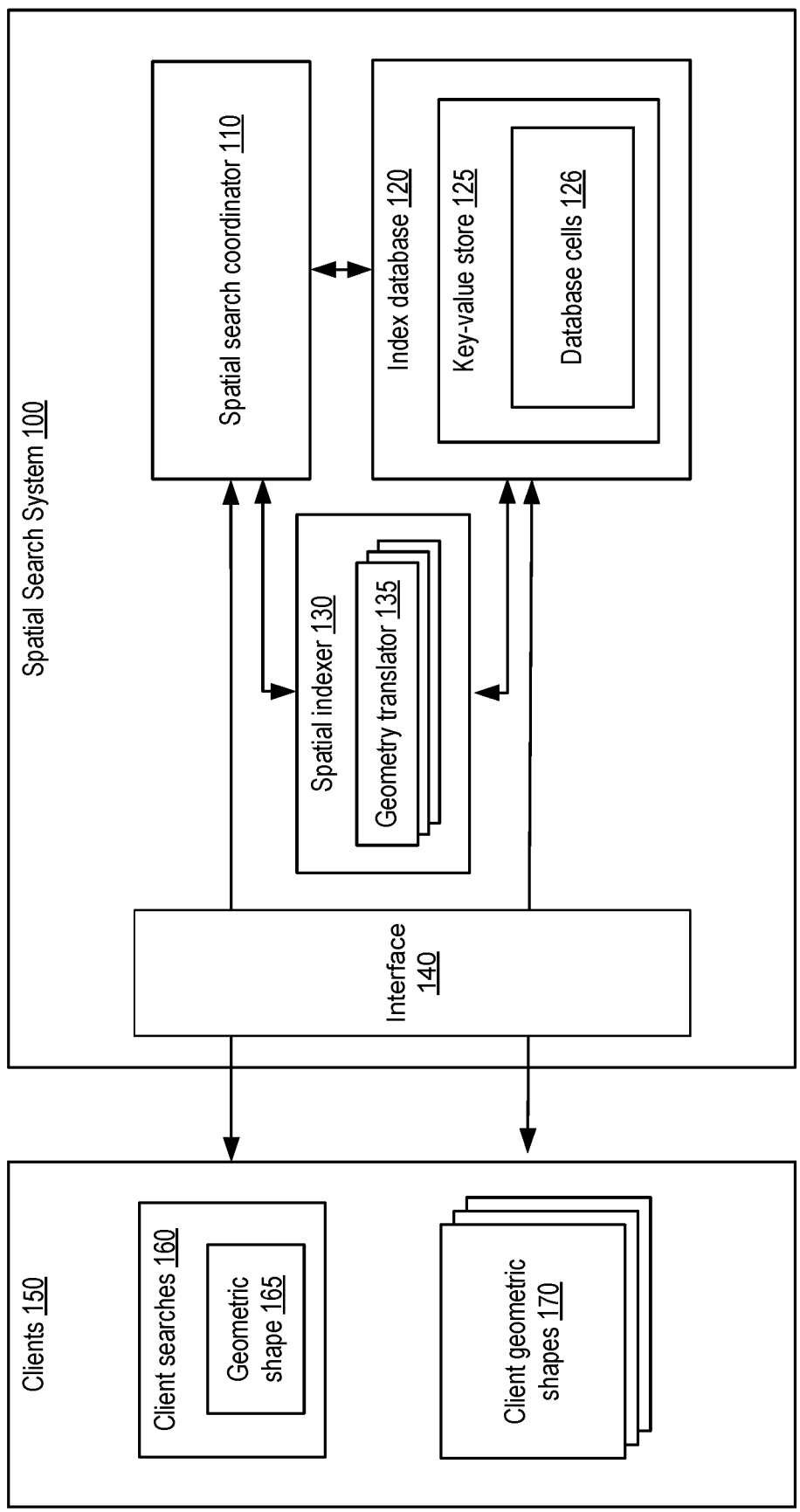
FIG. 1 illustrates an exemplary system environment in which spatial searches using a key-value store may be performed, according to at least some embodiments.

Various techniques for performing a spatial search using representations of geometric shapes stored in a key-value store are described. According to some embodiments, a key-value store may be used to record a collection of predefined geometric shapes, where the geometric shapes may be decomposed into one or more spatial cells represented as spatial indexes in the key-value store. A spatial search process may then use deterministic space division to traverse the search space to execute spatial queries. As one skilled in the art will appreciate in light of this disclosure, certain embodiments may be capable of achieving significant improvements in search performance by exploiting the deterministic space division enabled in these embodiments.
Example System Environment FIG. 1 illustrates a system environment in which spatial searches using a key-value store may be performed, according to at least some embodiments. In some embodiments, a spatial search system 100, such as implemented on a computing system 2000 as shown below in FIG. 10, may include a Spatial search coordinator 110, and Index database 120, each of which may employ a Spatial indexer 130 that provides a Geometry translator 135.

The Index database 120 may further employ one or more Key-value stores 125 in some embodiments, while in other embodiments other storage subsystems may be used, such as a relational database system.

The Spatial search coordinator 110 and Index database 120 may provide services to Clients 150 of the Spatial search system 100 via one or more Programmatic interfaces 140 such as web-based interfaces, command-line tools and application programming interfaces.

Figure 2:
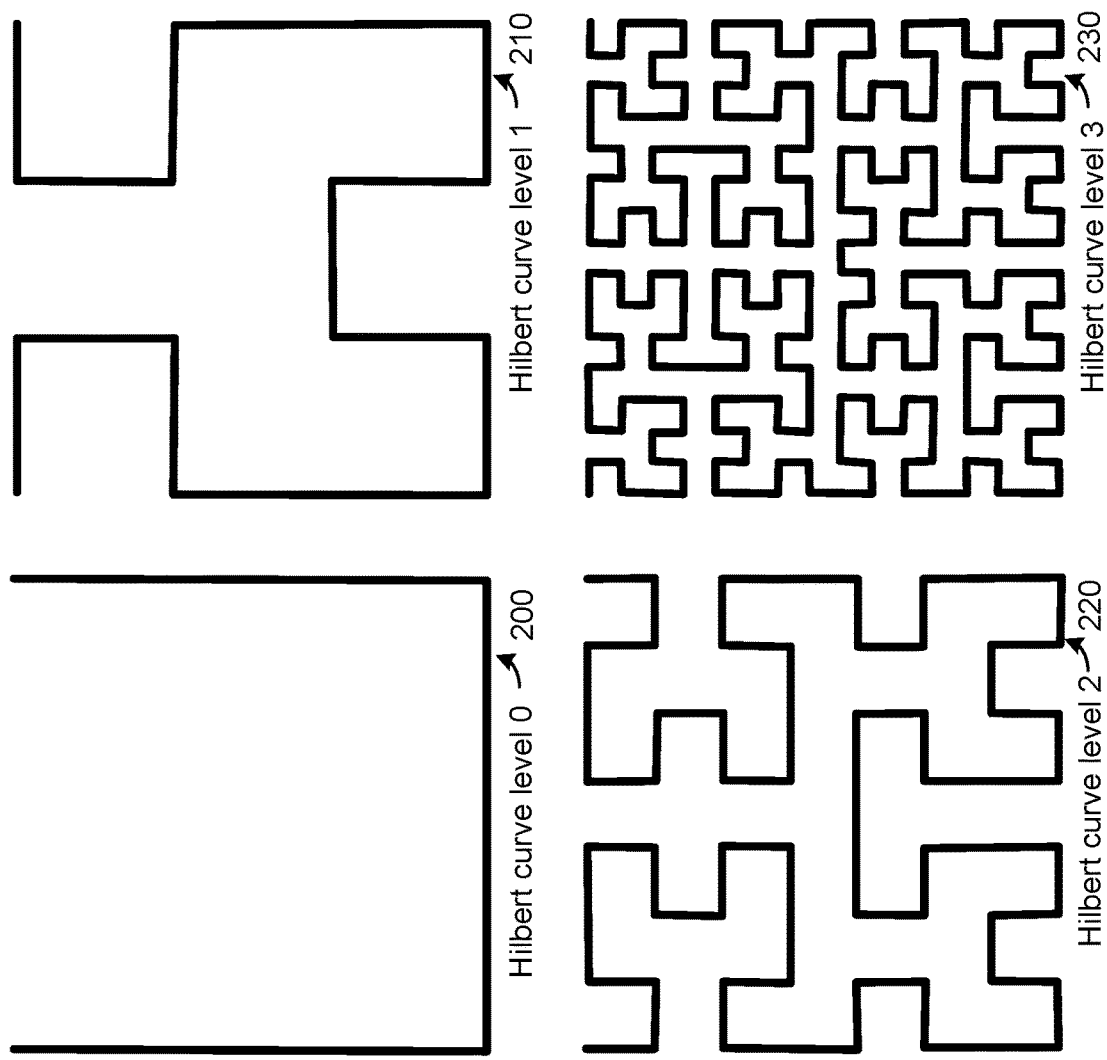
FIG. 2 illustrates examples of space-filling curves of various levels, according to some embodiments.

Clients 150 may, in some embodiments, define Geometric shape data 126 by submitting Client geometric shapes 170 to the Index database 120 via the Programmatic interfaces 140. The Index database 120 may, in some embodiments, use the Spatial indexer 130 and one or more Geometry translators 135 to translate and decompose the Client geometric shapes 170 into spatial cells for storage in the one or more Key-value stores 125 as Geometric shape data 126. Clients may further submit Client searches 160 to the Spatial search coordinator 110 via the Programmatic interfaces 140. These searches, in some embodiments, may include a definition of a Geometric shape 165 including one or more geometric points. In some embodiments, a Client search 160 may include additional information such as identifiers of Client geometric shapes 170.
Geometry Translation FIG. 2 illustrates examples of space-filling curves of various levels, according to some embodiments. Clients of a spatial search system, such as the Spatial search system 100 of FIG. 1, may submit geometric shapes, such as shapes 165 and 170 of FIG. 1, encoded as a collection of points defined using any of a number of coordinate systems. For example, in some embodiments a Cartesian coordinate system may be used while in other embodiments other coordinate systems, such as polar coordinate systems, may be used. Embodiments suitable for global spatial searches may employ, for example, latitude and longitude coordinates. Those skilled in the art will appreciate that these various example coordinate systems are not intended to be limiting, and any number of coordinate systems may be employed. Furthermore, while coordinate systems employing two dimensions may be implemented, more than two dimensions may also be used. In some embodiments, different dimensions of different types may be combined. For example, the coordinate system may, for example, be a spatiotemporal coordinate system (e.g., a coordinate system incorporating dimensions of both space and time), which may support spatiotemporal searches in some embodiments.

In embodiments employing multiple dimensions, coordinate dimensions may be reduced to a single dimension for searching. To accomplish this reduction, a space-filling curve, such as a Hilbert curve or z-order curve, may be employed in some embodiments. Such space-filling curves define points in a multi-dimensional space as locations along a single-dimensional path that fills the multi-dimensional space. Examples of such paths are shown in FIG. 2.

In FIG. 2, a Hilbert curve of level 0 (200) defines a path within a two-dimensional space, dividing the space into four quadrants represented by the endpoints and corners of the path. These four quadrants may be represented by the digits zero through three in some embodiments.

FIG. 2 further shows a Hilbert curve of level 1 (210) that defines a path within the same two-dimensional space such that each of the four quadrants defined by the level 0 Hilbert curve (200) may be further subdivided into four quadrants in some embodiments. Like the level 0 Hilbert curve, the sixteen quadrants are represented by the endpoints and corners of the level 1 Hilbert curve path.

Likewise, FIG. 2 also shows Hilbert curves of levels 2 (220) and level 3 (230) where each further subdivides the two-dimensional space into smaller quadrants, yielding sixty four quadrants and two hundred fifty six quadrants, respectively.

Figure 3:
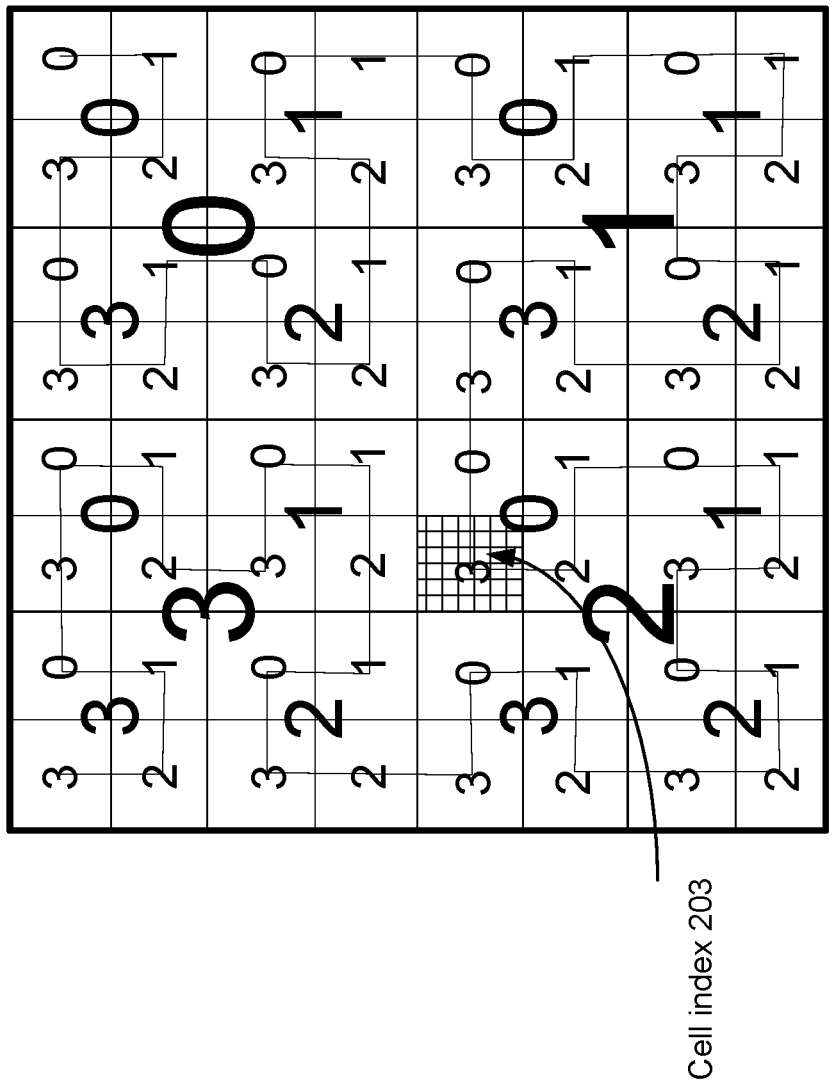
FIG. 3 illustrates encoding of spatial cells according to a space filling curve, according to some embodiments.

FIG. 3 illustrates encoding of spatial cells according to a space filling curve, according to some embodiments. As discussed in FIG. 2, a space-filling curve, such as a Hilbert curve, may subdivide a two-dimensional space into quadrants. Shown in FIG. 3 is a Hilbert curve of level 2 which may subdivide a two-dimensional space into sixty four quadrants.

Each level of a Hilbert curve may define four quadrants represented by digits zero through three, with each subsequent level further subdividing each quadrant, in some embodiments. In the example shown in FIG. 3, the two-dimensional space may therefore be represented as a three-digit, base four number, either in integer or string form, with the most significant digit representing the quadrant defined by level 0 of the curve. Quadrants of a given level, as shown in FIG. 3, may be assigned increasing numbers, with the upper right quadrant assigned a value of 0 and respective increasing values assigned to the lower right, lower left and finally the upper left quadrant. Those skilled in the art will appreciate that such example assignments are not intended to be limiting and any sortable representation of the quadrants may be employed. Furthermore, assignment of sortable values to the quadrants may occur in different orders in various embodiments.

For example, a Cell index identified in FIG. 3 may be identified as the base four integer value of 203 or the string "203". This example cell index has a quadrant defined by a level 0 quadrant of two, a level 1 quadrant of zero and a level two quadrant of three. This cell, therefore, has an index value of 203 in the two-dimensional space. These indexes may be further referred to as quad-key indexes. Those skilled in the art will appreciate that the number of levels in the example of FIG. 3 is not intended to be limiting and any number of levels may be employed, trading off resolution of the transform with storage requirements and search efficiency.

In some embodiments suitable for global spatial searches, latitude and longitude coordinates may be may employed. These latitude and longitude coordinates may define locations on the surface of a sphere rather than locations on a two-dimensional plane as is discussed above in FIG. 2 and FIG. 3. In these embodiments, a spherical projection of the surface may be made onto the surface of a cube including six, two-dimensional surfaces. In some embodiments, the quad-key index of FIG. 3 may be augmented to support this spherical projection by prepending a six-valued digit representing the face of the cube on which the point lies.

Spatial indexes may not be limited to a single space filling curve or encoding. In some embodiments, a composite index may be employed including, for example, an indoor space spatial index together with a geographic spherical spatial index. Those skilled in the art will appreciate that such example indexes are not intended to be limiting, and a spatial search system, such as the Spatial search system 100 of FIG. 1, may employ any number of geometry translations, such as implemented by Geometry translator 135, alone or in combination.

Converting Geometric Shape into Spatial Indexes

Figure 4:
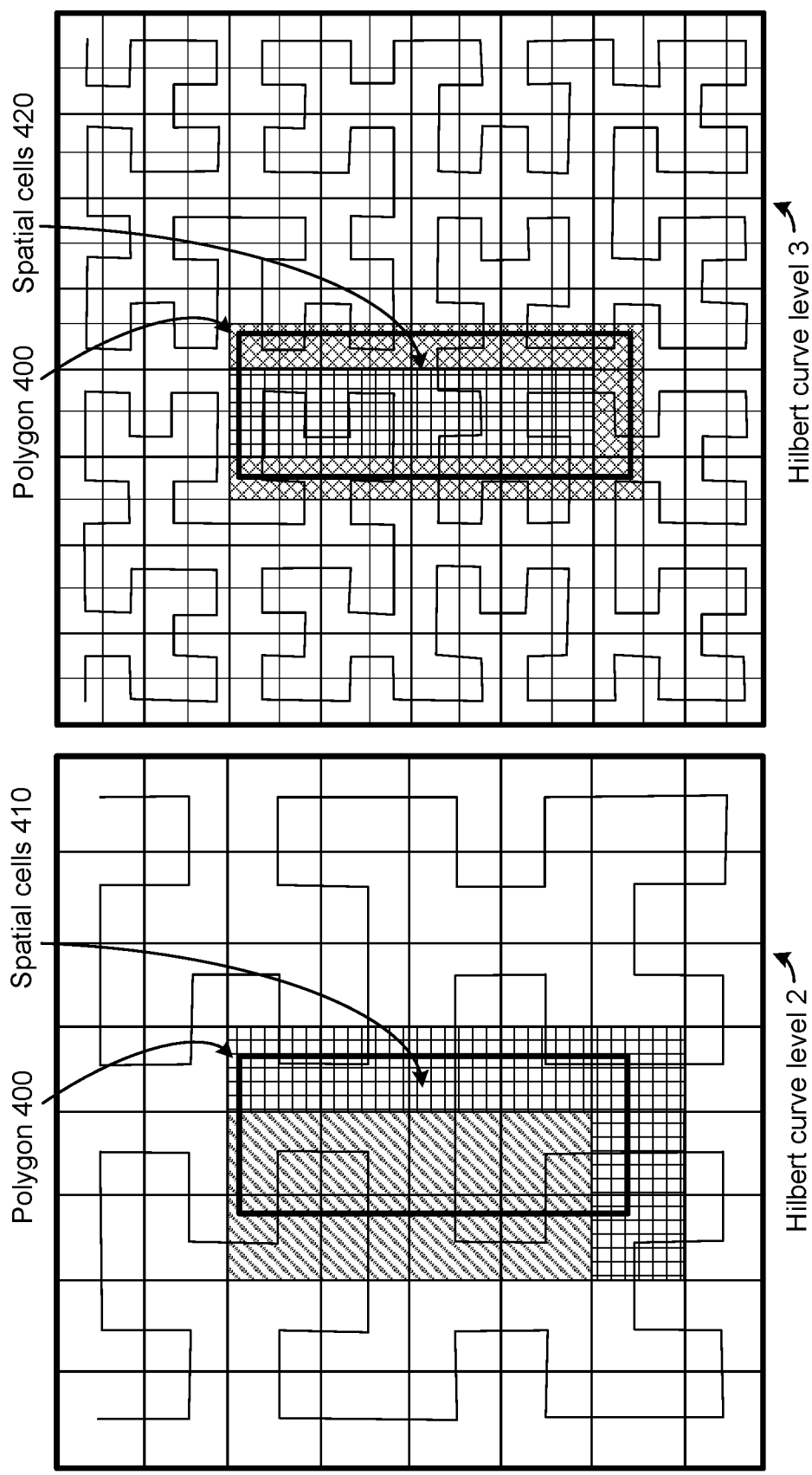
FIG. 4 illustrates a geometric shape encoded as a collection of spatial cells for space filling curves of different levels, according to some embodiments.

FIG. 4 illustrates a geometric shape encoded as a collection of spatial cells for space filling curves of different levels, according to some embodiments. A Polygon 400 may be represented by a collection of spatial cells defining a region of a two dimensional space, where each of the spatial cells is represented by a quad-key index.

As shown in FIG. 4, the Polygon 400 may be represented in some embodiments by Spatial cells 410 using a Hilbert curve of a maximum level 2 while the same Polygon 400 may be represented in other embodiments by Spatial cells 420 using a Hilbert curve of a maximum level 3. Those skilled in the art will appreciate that the collection of spatial cells may be represented in a number of ways. In FIG. 3, Spatial cells 410 and 420 may be represented using the largest possible spatial cells, for example using Spatial cells 410*a*-410*i* and 420*a*-420*x* respectively, contained within the Polygon 400, thus minimizing the number of cells required. As the number of levels in in the space-filling curve are increased, the number of digits in the resultant quad-key indexes of the member cells may also increase, but the accuracy of the polygon representation may be improved, thus resulting in a trade-off between representations of geometric shapes, storage requirements and search performance.

Example Spatial Search

Figure 5:
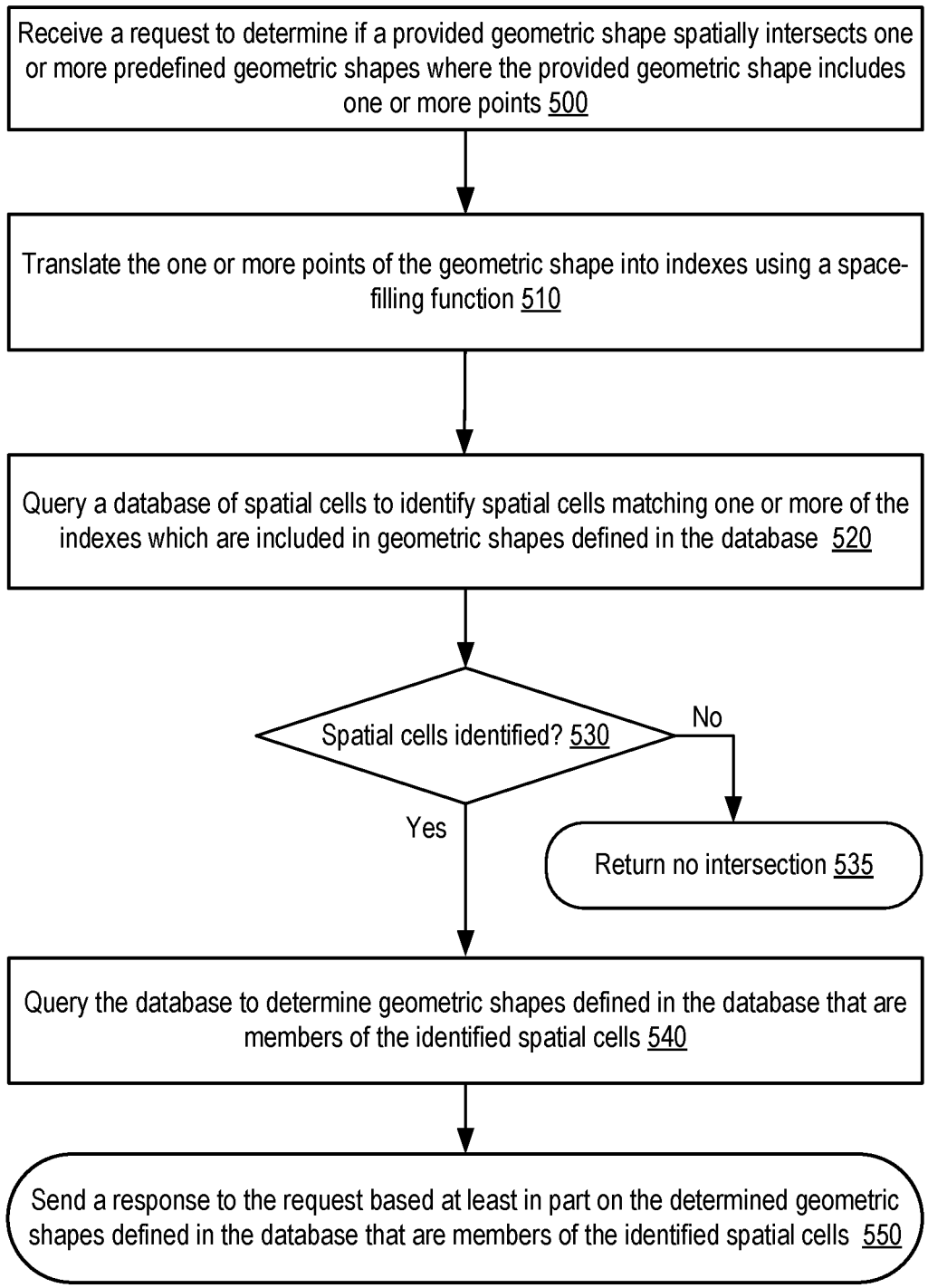
FIG. 5 is a high-level flowchart of performing a spatial search using a key-value store, according to some embodiments.

FIG. 5 is a high-level flowchart of performing a spatial search using a key-value store, according to some embodiments. The process begins at step 500 where a request is received, such as through client query 160 as shown in FIG. 1, to determine if a provided geometric shape spatially intersects one or more predefined geometric shapes. In some embodiments the request may include a geometric shape including one or more points encoded a number of ways, such as discussed earlier in FIG. 4.

The process proceeds to step 510 where the one of more points of the provided geometric shape may be translated to spatial cell indexes such as described earlier in FIG. 4. This translation may involve the use of space-filling functions such as a Hilbert curve in some embodiments.

The process then proceeds to step 520 where a database of spatial cells may be queried to identify spatial cells matching the one or more translated spatial indexes, the spatial cells included in geometric shapes defined in the database. An example of such a database is the Key-value store 125 as shown in FIG. 1. Further details of the database are discussed further in FIG. 6 and further details of the query are discussed below in FIG. 7 and FIG. 8.

If the query identifies no intersecting spatial cells as indicated in a negative exit of step 530, the proceeds to step 535 where the process returns an indication of no intersecting geometric shapes. Otherwise, the process proceeds to step 540.

In step 540, the database may be further queried to determine geometric shapes defined in the database that are members of the previously identified spatial cells. A response to the request may then be sent based at least in part on these determined geometric shapes in some embodiments, as shown in step 550.

Key-Value Store

FIG. 6 illustrates example data in a key-value store representing a known geometric shape, according to some embodiments. In some embodiments, a key-value store may implement data storage where data values are identified by unique keys. In some of these embodiments, these unique keys may be composite keys that may be subdivided into separate sort keys 610 and partition keys 620. Data items may be stored in respective partitions of the key-value store using the partition key 620, where data items stored on the same partition of the key-value store may be stored in a sorted order as determined by the sort keys 610 of the respective data items.

In some embodiments, the key-value store may include cell prefix records and cell membership records, as indicated respectively as CPR and CMR records in the type 600. For cell prefix records (CPR), the partition keys 620 may be defined as individual ones of the spatial indexes of geometric shapes defined in the key-value store, in some embodiments, while the sort keys 610 may include an initial number of quad-key digits of the respective partition keys of individual ones of the spatial indexes of the defined geometric shapes, according to some embodiments. The initial number of quad-key digits may be referred to as a cell prefix. In some embodiments, a key-value store may serve multiple clients. To accommodate multiple clients, the sort keys may also be prepended with a client identifier, as in the ClientID portions of the sort keys 610 of CPR records in FIG. 6. This allows different clients 150 of the spatial search system 100 to define private geometric shapes in the key-value store.

For cell membership records (CMR), the partition keys 620 may be defined as individual ones of the spatial indexes of geometric shapes defined in the key-value store, in some embodiment, thus matching partition keys 620 of cell prefix records, while the sort keys 620 may be defined using unique identifiers of particular geometric shapes including the spatial cells, as in the GeometryID portions of the sort keys 610 of CMR records in FIG. 6. In embodiments where a key-value store serves multiple clients, the partition keys and sort keys of cell membership records may also be prepended with the client identifier, as discussed above regarding cell prefix records.

Iterative Key-Value Store Search

FIG. 7 illustrates a series of spatial search ranges used to perform a search for a particular spatial cell on a key-value store to identify spatial cells intersecting a geometric shape, according to some embodiments. The particular spatial cell may be identified using index 2/22100303203000212110231332132, similar to the example key-value store entries shown in FIG. 6 above. A spatial search may implement a sliding window technique to subdivide the search into a number of iterations, in some embodiments. In the example shown in FIG. 7, a two level fixed window of the sliding window technique is shown, where the two level fixed window is applied sequentially to the index in a sliding fashion to generate a series of search index ranges. The first query may include a range starting with the entire index of the particular spatial cell, as shown in the start 700 of query 1, and ending with the index of the particular spatial cell minus a number of trailing quad-key digits defined by the fixed window, as shown in the end 710 of query 1. Subsequent queries may include a range starting with the ending value of the previous query, and queries may continue until the ending value of a query matches the cell prefix as discussed above in FIG. 6.

Figure 8:
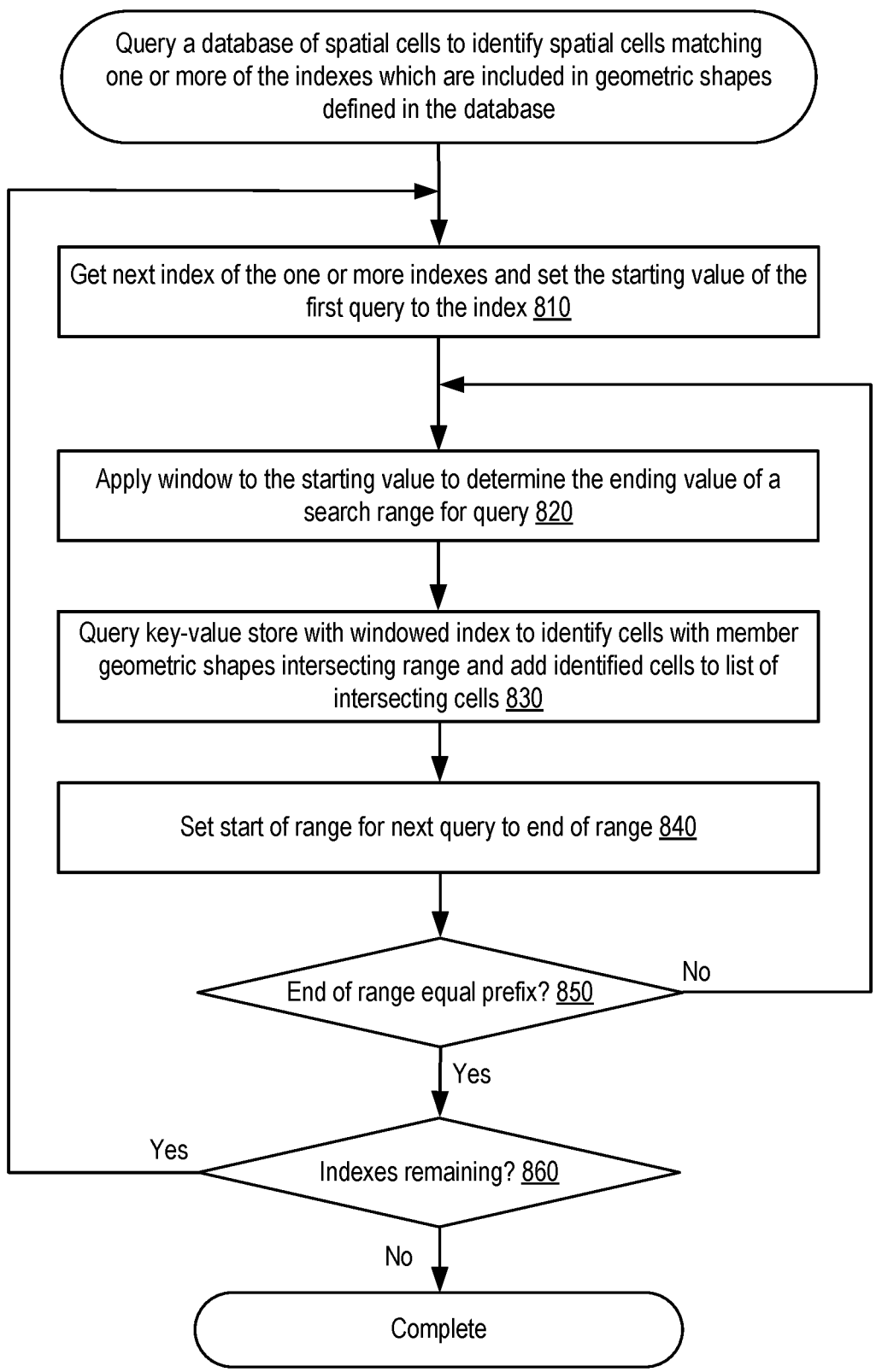
FIG. 8 is a high-level flowchart of querying a key-value store to identify spatial cells intersecting a geometric shape, according to at least some embodiments.

FIG. 8 is a high-level flowchart of querying a key-value store to identify spatial cells intersecting a geometric shape, according to at least some embodiments. The process begins at step 810 where one or more indexes of a geometric shaped are to be search for intersection with known geometric shapes stored in a key-value store such as the Key-value store 125 of FIG. 1. In some embodiments, the key-values store may contain data such as illustrated in FIG. 6 and the process may implement an iterative set of queries as illustrated in FIG. 7.

Initially, the process has identified a list of no spatial cells matching the one or more indexes of the geometric shape. At step 810, a next index of the one or more indexes is selected and a starting value of a search range for a first query is set to the selected index. The process then proceeds to step 820 where a window, such as the two level fixed window of FIG. 7, is applied to the starting value of the range to determine an ending value of the range.

The process then proceeds to step 830 where the key-value store is queried with the search range to identify cells with member geometric shapes intersecting the search range. The identified cells may then be added to an accumulating list of intersection spatial cells, in some embodiments.

The process then proceeds to step 840 where the starting value of a next search, if needed, is set to the ending value of the range of the most recently completed search. As shown in step 850, if the ending value of the range of the most recently completed search is not equal to a prefix value determined for the selected index, such as a cell prefix value of a partition key 620 of FIG. 6, then the process returns to step 820. Otherwise, the search for current spatial index is complete and if additional indexes remain, as shown in step 860, the process returns to step 810. Otherwise, the process is complete and an accumulated list of intersection spatial cells is provided.

Illustrative Geofencing Service

Figure 9:
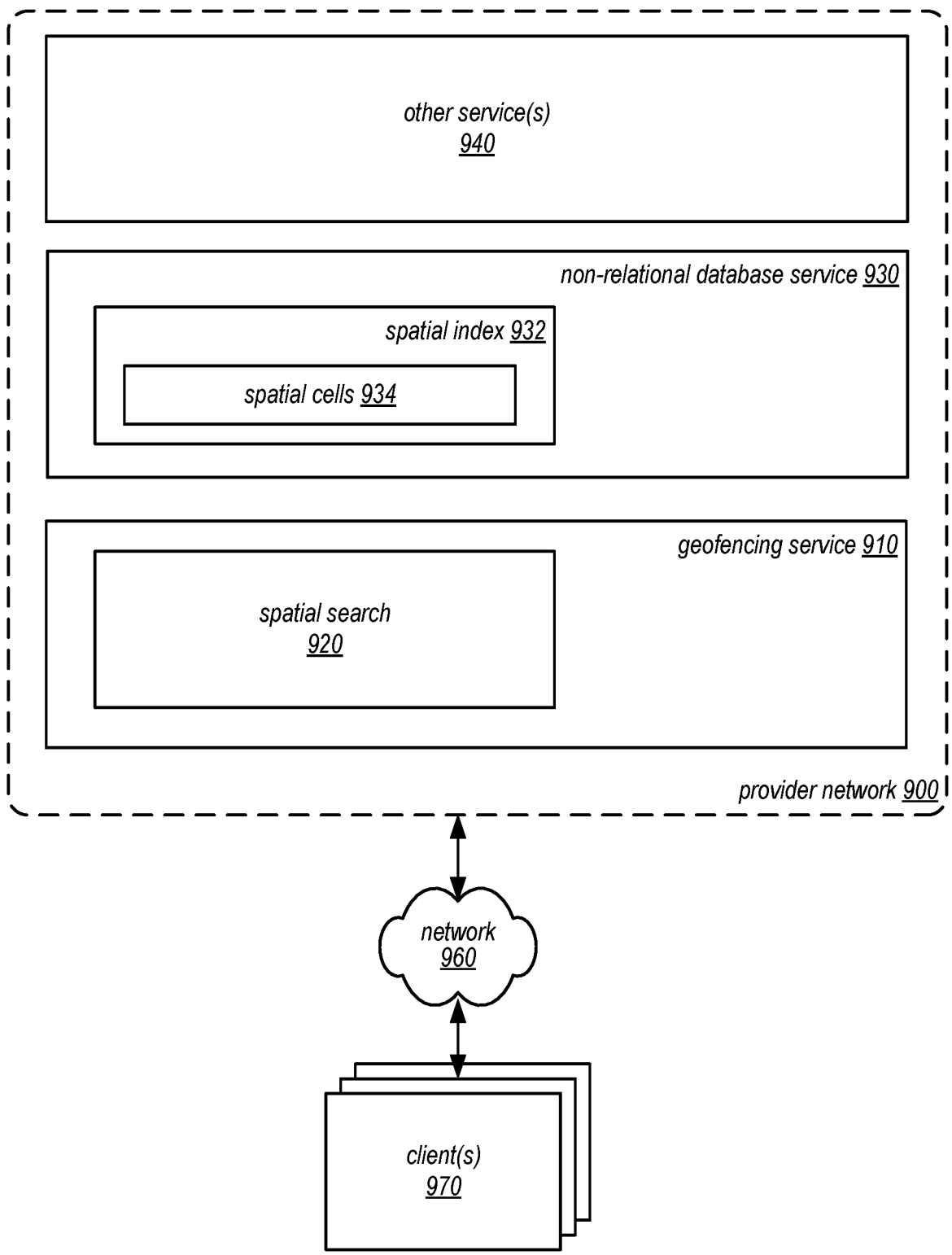
FIG. 9 is a block diagram illustrating an example provider network offering a geofencing service that implements spatial searches using a non-relational database service, according to some embodiments.

FIG. 9 is a block diagram illustrating an example provider network offering a geofencing service that implements spatial searches using a non-relational database service, according to some embodiments. Provider network 900 may be a private or closed system, in some embodiments, or may be set up by an entity such as a company or a public sector organization to provide one or more services (such as various types of cloud-based storage) accessible via the Internet and/or other networks to clients 970, in another embodiment. In some embodiments, provider network 900 may be implemented in a single location or may include numerous data centers hosting various resource pools, such as collections of physical and/or virtualized computer servers, storage devices, networking equipment and the like (e.g., computing system 2000 described below with regard to FIG. 10), needed to implement and distribute the infrastructure and storage services offered by the provider network 900. In some embodiments, provider network 900 may implement various computing resources or services, such as geofencing service 910, non-database service 930 (e.g., a NoSQL database or other database service that may utilize key values to access collections of items (e.g., tables that include items)), and other services 940, such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 9 may be implemented directly within computer hardware, as instructions directly or indirectly executable by computer hardware (e.g., a microprocessor or computer system), or using a combination of these techniques. For example, the components of FIG. 9 may be implemented by a system that includes a number of computing nodes (or simply, nodes), in some embodiments, each of which may be similar to the computer system embodiment illustrated in FIG. 9 and described below. In some embodiments, the functionality of a given system or service component (e.g., a component of key value non-relational database service 930) may be implemented by a particular node or may be distributed across several nodes. In some embodiments, a given node may implement the functionality of more than one service system component (e.g., more than one data store component).

Geofencing service 910 may provide services to specify, manage, modify, deploy, and/or delete geofences or other virtually defined geographic boundaries, in some embodiments. Geofencing service 910 may support various types of applications for security, automation, communications, or advertising, among other applications. As discussed above with regard to FIG. 1, spatial searches may be performed with respect to geometric shapes which may be implemented as part of (or be) a geofence. Therefore, the various techniques and/or features discussed above with regard to FIGS. 1-8 regarding spatial search system 100 may be implemented as a spatial search feature 920 of geofencing service 910.

Geofencing service 910 may utilize other services offered by provider network 900. For example, geofencing service 910 may store spatial index 932 and spatial cells 934 for performing spatial searches as described above with regard to FIGS. 1-8 in a key-value store implemented as part of non-relational database service 930, which may be implemented as discussed below.

Non-relational database service 930 may be implemented as various types of distributed database services, in some embodiments, for storing, accessing, and updating data in tables hosted in key-value database. Such services may be enterprise-class database systems that are highly scalable and extensible. In some embodiments, access requests (e.g., requests to get/obtain items, put/insert items, delete items, update or modify items, scan multiple items) may be directed to a table in non-relational database service 930 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, non-relational database service 930 may provide a RESTful programmatic interface in order to submit access requests (e.g., to get, insert, delete, or scan data).

In some embodiments, clients 970 may encompass any type of client configurable to submit network-based requests to provider network 900 via network 960, including requests for geofencing service 910 (e.g., to perform a spatial search request as discussed above) or database service 930 (e.g., to access item(s) in a table in non-relational database service 930). For example, in some embodiments a given client 970 may include a suitable version of a web browser, or may include a plug-in module or other type of code module that executes as an extension to or within an execution environment provided by a web browser. Alternatively in a different embodiment, a client 970 may encompass an application such as a navigation client/application (or user interface thereof), or any other application, that may make use of a geofencing services 910. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 970 may be an application that interacts directly with provider network 900, in some embodiments. In some embodiments, client 970 may generate network-based services requests according to a Representational State Transfer (REST)-style network-based services architecture, a document- or message-based network-based services architecture, or another suitable network-based services architecture. Note that in some embodiments, clients of services such as geo-fencing service 910 or database service 930 may be implemented within provider network 900 (e.g., applications hosted on a virtual compute service).

Client(s) 970 may convey network-based services requests to and receive responses from provider network 900 via network 960, in some embodiments. In some embodiments, network 960 may encompass any suitable combination of networking hardware and protocols necessary to establish network-based-based communications between clients 970 and provider network 900. For example, network 960 may encompass the various telecommunications networks and service providers that collectively implement the Internet. In some embodiments, network 960 may also include private networks such as local area networks (LANs) or wide area networks (WANs) as well as public or private wireless networks. For example, both a given client 970 and provider network 900 may be respectively provisioned within enterprises having their own internal networks. In such an embodiment, network 960 may include the hardware (e.g., modems, routers, switches, load balancers, proxy servers, etc.) and software (e.g., protocol stacks, accounting software, firewall/security software, etc.) necessary to establish a networking link between given client(s) 970 and the Internet as well as between the Internet and provider network 900. It is noted that in some embodiments, client(s) 970 may communicate with provider network 900 using a private network rather than the public Internet.

In some embodiments, non-relational database service 930 may implement a control plane to implement one or more administrative components, such as automated admin instances which may provide a variety of visibility and/or control functions). In various embodiments, the control plane may direct the performance of different types of control plane operations among the nodes, systems, or devices implementing non-relational database service 930, in some embodiments. The control plane may provide visibility and control to system administrators via an administrator console, in some embodiment. The admin console may allow system administrators to interact directly with non-relational database service 930 (and/or the underlying system). In some embodiments, the admin console may be the primary point of visibility and control for non-relational database service 930 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. The control plane may provide an interface or access to information stored about one or more detected control plane events, such as data backup or other management operations for a table, at non-relational database service 930, in some embodiments.

Non-relational database service 930 may provide various kinds of automated resource allocation, in some embodiments, for storing data in table submitted to non-relational database service 930. For instance, the control plane may communicate with processing nodes to initiate the performance of various control plane operations, such as moves of multi-table partitions, splits of multi-table partitions, update tables, delete tables, create indexes, etc . . . . In some embodiments, the control plane may include a node recovery feature or component that handles failure events for storage nodes that store database information (e.g., adding new nodes, removing failing or underperforming nodes, deactivating or decommissioning underutilized nodes, etc).

Various durability, resiliency, control, or other operations may be implemented by non-relational database service 930. For example, non-relational database service 930 may detect split, copy, or move events for multi-table partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance.

In some embodiments, non-relational database service may automatically handle changes to the size or amount of data store. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

Split or move events may be detected by a control plane or other component of non-relational database service 930 in various ways. For example, partition size and heat, where heat may be tracked by internally measured metrics (such as IOPS), externally measured metrics (such as latency), and/or other factors may be evaluated with respect to various performance thresholds.

Different models, schemas or formats for storing data for database tables in non-relational database service 930 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the non-relational database service 930 (and the underlying storage system) may have no pre-defined schema other than their reliance on the primary key.

Metadata or other system data for tables may also be stored as part of database partitions using similar partitioning schemes and using similar indexes, in some embodiments.

Non-relational database service 930 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by non-relational database service 930 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by non-relational database service 930 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Non-relational database service 930 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the non-relational database service 930 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Illustrative Computer System

Figure 10:
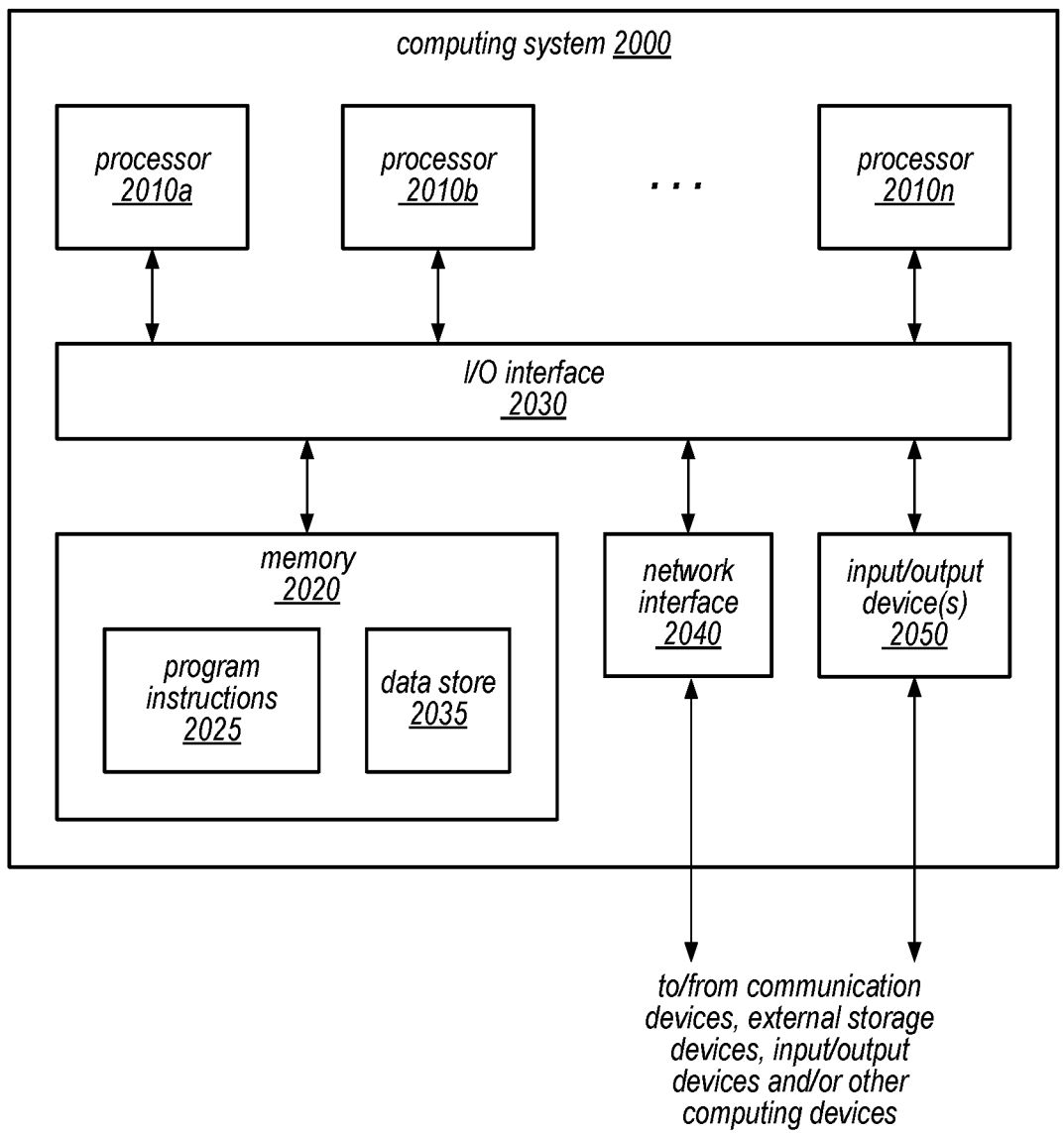
FIG. 10 is a block diagram illustrating an example computing device that may be used in at least some embodiments.

Embodiments to implement a spatial search as described herein may be executed on one or more computer systems, which may interact with various other devices. One such computer system is illustrated by FIG. 10. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions, in one embodiment. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 2020 may store program instructions 2025 and/or data accessible by processor 2010, in one embodiment. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. A computer-accessible medium may include non-transitory storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040, in one embodiment.

In one embodiment, I/O interface 2030 may be coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000, in one embodiment. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000, in one embodiment. Multiple input/output devices 2050 may be present in computer system 2000 or may be distributed on various nodes of computer system 2000, in one embodiment. In some embodiments, similar input/output devices may be separate from computer system 2000 and may interact with one or more nodes of computer system 2000 through a wired or wireless connection, such as over network interface 2040.

As shown in FIG. 10, memory 2020 may include program instructions 2025 implementing the various embodiments of the systems as described herein, and data store 2035 comprising various data accessible by the program instructions 2025, in one embodiment. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 2000 may be transmitted to computer system 2000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of methods may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
a key-value data store comprising a plurality of spatial cell indexes and a plurality of cell membership indexes;
at least one processor; and
a memory, storing program instructions that when executed cause the at least one processor to implement a geofencing service, configured to:
receive a request from a client to perform a spatial search, wherein the request comprises a provided geometric shape and an identifier of a predefined geometric shape, wherein the spatial search identifies geometric shapes that intersect the provided geometric shape;

translate the provided geometric shape into one or more indexes composing the provided geometric shape, the one or more indexes translated in accordance with a space-filling curve that defines points within a multi-dimensional space as locations along a single-dimensional path that fills the multi-dimensional space;

identify one or more spatial cells matching at least one of the one or more indexes, wherein to identify the one or more spatial cells the geofencing service is configured to perform, for individual ones of the one or more indexes, a plurality of queries of a key-value store using a sliding window on the respective index;

query the cell membership indexes of the key-value store to determine one or more members of the identified spatial cells; and send to the client a response to the request based at least in part on the identifier of the predefined geometric shape matching one of the determined one or more members of the identified spatial cells.

2. The system of claim 1, wherein the spatial search is a spatiotemporal search.

3. The system of claim 1, wherein the translating of the geometric shape into one or more indexes is performed using a spherical projection.

4. The system of claim 1, wherein the geofencing service supports a plurality of clients including the client, and wherein at least one of the plurality of cell indexes comprises an identifier associated with the client of the plurality of clients.

5. A method, comprising:
receiving a request from a client to perform a spatial search, the request comprising a geometric shape;
translating the geometric shape into one or more indexes composing the geometric shape, the one or more indexes translated in accordance with a space-filling curve that defines points within a multi-dimensional space as locations along a single-dimensional path that fills the multi-dimensional space;
identifying one or more spatial cells matching at least one of the one or more indexes by querying a key-value store comprising a plurality of cell indexes describing spatial cells;
querying the key-value store to determine one or more geometric shapes that are members of the identified spatial cells, the key-value store further comprising a plurality of cell membership indexes; and
sending to the client a response to the request to perform the spatial search based at least in part on the determined one or more members of the identified spatial cells.

6. The method of claim 5, wherein the geometric shape is a point and wherein the spatial search identifies geometric shapes that contain or intersect the point.

7. The method of claim 5, wherein the geometric shape comprises multiple points and wherein the spatial search identifies geometric shapes that contain or intersect the geometric shape.

8. The method of claim 5, wherein identifying the one or more spatial cells matching at least one of the one or more indexes comprises performing, for individual ones of the one or more indexes, a plurality of queries of the key-value store using a sliding window on a respective index.

9. The method of claim 5, wherein the spatial search is a spatiotemporal search.

10. The method of claim 5, wherein the geometric shape comprises two or more spatial dimensions.

11. The method of claim 5, wherein the translating of the geometric shape into one or more indexes is performed using a spherical projection.

12. The method of claim 5, wherein the receiving, the translating, the identifying, the querying and the sending are performed by a geofencing service, wherein the geofencing service supports a plurality of clients including the client, and wherein at least one of the a plurality of cell indexes comprises an identifier associated with the client of the plurality of clients.

13. One or more non-transitory, computer-readable storage media, storing program instructions that when executed on or across one or more computing devices cause the one or more computing devices to implement:
receiving a request from a client to perform a spatial search, the request comprising a geometric shape;
translating the geometric shape into one or more indexes composing the geometric shape, the one or more indexes translated in accordance with a space-filling curve that defines points within a multi-dimensional space as locations along a single-dimensional path that fills the multi-dimensional space;
identifying one or more spatial cells matching at least one of the one or more indexes by querying a key-value store comprising a plurality of cell indexes describing spatial cells;
querying the key-value store to determine one or more geometric shapes that are members of the identified spatial cells, the key-value store further comprising a plurality of cell membership indexes; and
sending to the client a response to the request to perform the spatial search based at least in part on a comparison of the determined one or more members of the identified spatial cells with one or more geometric shapes identified by search criteria of the request to perform the spatial search.

14. The one or more non-transitory, computer-readable storage media of claim 13, wherein the geometric shape is a point and wherein the spatial search identifies geometric shapes that contain or intersect the point.

15. The one or more non-transitory, computer-readable storage media of claim 13, wherein the geometric shape comprises multiple points and wherein the spatial search identifies geometric shapes that contain or intersect the geometric shape.

16. The one or more non-transitory, computer-readable storage media of claim 13, wherein identifying the one or more spatial cells matching at least one of the one or more indexes comprises performing, for individual ones of the one or more indexes, a plurality of queries of the key-value store using a sliding window on a respective index.

17. The one or more non-transitory, computer-readable storage media of claim 13, wherein the spatial search is a spatiotemporal search.

18. The one or more non-transitory, computer-readable storage media of claim 13, wherein the geometric shape comprises two or more spatial dimensions.

19. The one or more non-transitory, computer-readable storage media of claim 13, wherein the translating of the geometric shape into one or more indexes is performed using a spherical projection.

20. The one or more non-transitory, computer-readable storage media of claim 13, wherein the receiving, the translating, the identifying, the querying and the sending are performed by a geofencing service, wherein the geofencing service supports a plurality of clients including the client, and wherein at least one of the a plurality of cell indexes comprises an identifier associated with the client of the plurality of clients.

* * * * *